United States Patent [19]
Schatz

[11] Patent Number: 5,114,071
[45] Date of Patent: May 19, 1992

[54] HEAT STORAGE MEANS
[76] Inventor: Oskar Schatz, Waldpromenade 16, DW-8035 Gauting, Fed. Rep. of Germany
[21] Appl. No.: 665,308
[22] Filed: Mar. 5, 1991
[51] Int. Cl.⁵ .............................................. B60H 1/02
[52] U.S. Cl. .................................. 237/12.3 C; 237/44; 126/110 B
[58] Field of Search ............... 237/44, 12.3 A, 12.3 B, 237/12.3 R, 12.3 C; 126/110 R, 110 B, 110 D

[56] References Cited
FOREIGN PATENT DOCUMENTS
302272 2/1989 European Pat. Off. .............. 237/44

Primary Examiner—Henry A. Bennet
Attorney, Agent, or Firm—Harness, Dickey & Pierce

[57] ABSTRACT

In the context of a latent heat storage means for vehicle heating systems run on waste engine heat, comprising an inner container accommodating a storage core, an outer containing surrounding the inner one with a clearance to constitute a preferably evacuated insulating space, two ducts running from the outside through the insulating space to the inner container, of which one functions as a supply duct for a heat vehicle fluid and the other functions as a return duct therefor, and the inner container is suspended at two end walls, via a respective group of ribs with a low thermal conductivity, on the outer container, between a first end wall of the inner container and the outer container at least one spring is so arranged that it tends to change the distance apart of the opposite end walls of the inner container and of the outer container and between the container wall connecting the two end walls of the inner container and the adjacent container wall of the outer container the insulating space has its minimum thickness, the design is intended to prevent undesired displacement between the inner and outer containers and to ensure that the ribs of the suspensions at the two wall sections of the inner container are always under tension, and for this purpose the ribs, which are associated with the other, second end wall of the inner container, are able to be slid in the direction of the container wall which connects the end walls of the inner container, in relation to the inner container while perpendicularly thereto they are connected in a non-sliding manner with the inner container and between the ends, which are in engagement with the inner container, of these ribs and the inner container at least one spring is arranged, which tends to change the distance between these ends and the second end wall of the inenr container and therefore to keep the ribs under tension.

10 Claims, 3 Drawing Sheets

HEAT STORAGE MEANS

BACKGROUND OF THE INVENTION

The invention relates to a heat storage means and more particularly to a latent heat storage means for vehicle heating systems run on waste engine heat, comprising an inner container accommodating a storage core, an outer container surrounding the inner container with a clearance to constitute a preferably evacuated insulating space, two ducts running from the outside through the insulating space to the inner container, of which one functions as a supply duct for a heat vehicle fluid and the other functions as a return duct therefor, and the inner container is suspended at two end walls, via a respective group of ribs with a low thermal conductivity, on the outer container, between a first end wall of the inner container and the outer container at least one spring is so arranged that it tends to change the distance apart of the opposite end walls of the inner container and of the outer container and between the container wall connecting the two end walls of the inner container and the adjacent container wall of the outer container the insulating space has its minimum thickness.

A heat storage means of this type is described in the German patent publication 3,725,165 A.

In order to prevent losses of the stored heat as far as possible high efficiency insulation is necessary between the inner container and the outer container, in which respect it is also desirable for the insulation to have a minumum volume so that the overall volume of the heat storage means may be kept small, as is necessary in the case of installation in motor vehicles, because there is here only a small amount of space available for additional equipment. In order not to excessively increase the weight of the vehicle the weight of such a heat storage means should be kept low.

A form of insulation which more particularly complies with these requirements is a vacuum space left between the inner and outer containers. In this respect means for locating the inner container within the outer container is necessary, which for its part should have a minimum weight and should only allow minimum heat losses.

In the case of the known heat storage means there was therefore the purpose of fixing the inner container in an extremely simple way in the outer container, such fixing means having to satisfy furthermore the requirements for a minimum weight and allowance for expansion due to changes in temperature.

The fixation of the inner housing in the outer housing by means of suspension leads to the advantage that essentially only tensile forces have to be transmitted so that small cross section become possible, which on the one hand reduce the necessary weight and on the other hand keep the heat losses occurring low. The spring holds the suspension under tension and allows for the effects of thermal expansion and suppresses or damps undesired vibrations.

While attempting to keep the overall volume of the heat storage means as low as possible, it has been possible to diminish the thickness of the insulating space in the part connecting the end walls of the inner container so that it is only a few millimeters. In the case of such a design the walls of the inner and outer containers have to reliably keep to their set spacing and more particularly in the case of high vacuum insulation it is necessary to prevent contact between the containers.

It has turned out that a spring only associated with one end wall is not able to ensure such fixation in position. Owing to expansion and contraction due to thermal effects during the production and operation different absolute values may be assumed adjacent to the suspension means of the inner container associated with the two end walls, that is to say in the case of a suspension load adjacent to the one end wall by tension at the other wall the suspension may allow movement between the inner container and itself or, respectively, the outer container, in consequence of which the outer and the inner containers will move out of their parallel relative position. The occurrence of undesired vibrations or rattling noises may then not be prevented and furthermore the insulating effect may be impaired.

SHORT SUMMARY OF THE PRESENT INVENTION

Accordingly one object of the invention is to design a heat storage means of the type initially mentioned in such a manner that displacement between the inner container and the outer container may be certainly prevented.

A further object of the invention is to ensure that all ribs of the suspensions at the two wall section of the inner container are always under tension.

In order to attain these or other objects the ribs, which are associated with the other, second end wall of the inner container, are able to be slid in the direction of the container wall which connects the end walls of the inner container, in relation to the inner container while perpendicularly thereto they are connected in a non-sliding manner with the inner container and between the ends, which are in engagement with the inner container, of these ribs and the inner container at least one spring is arranged, which tends to change the distance between these ends and the second end wall of the inner container and therefore to keep the ribs under tension.

Therefore irrespectively of any inaccuracy in manufacture, of different thermal effects and of changes in length due to the design and different in their absolute values, at the two end walls the suspension of the inner container within outer container will be constantly held under tension so that rattling noises will not be able to occur. Furthermore the inner container, to the extent that the part of the relatively small insulating gap between its two end wall walls is concerned, is at all times maintained centered in relation to the outer container.

In accordance with an advantageous development of the invention for the connection of the associated ribs at the second end wall a plurality of connection bolts, which extend in the direction of action, is arranged with which an end, which is in the form of an attachment section, of a rib is connected in a longitudinally sliding manner.

Preferably the ribs so extend in an oblique manner to the direction of action of the springs that they are put under tension by the springs.

A further possible feature of the invention is such that the ribs of at least one group are combined as a suspension element so that there is a particularly simple possibility of assembly. Preferably, the suspension elements are in the form of stampings.

In keeping with yet another possible form of the invention at least one suspension element is secured in such a manner as to prevent relative twist with the inner container and preferably there are two attachment points for the suspension element, such points being arranged on one end wall of the inner container in a symmetrical arrangement with a distance between them. Then in conjunction with this there is the possibility of a further development of the invention such that the suspension element has two connection points associated with the connection points on the inner container, from which points there extend two respective ribs which are arranged in the form of a letter V, to an outer frame, and on the common bisector the connection points are so arranged that the two pairs of ribs, which are arranged in the form of a letter V, intersect so as to constitute a rhombic internal frame.

The spring associated with the first end wall of the inner container is preferably arranged between this first end wall and the other end wall which is opposite to it, and in accordance with a further convenient development of the invention the effective length of the spring associated with the first wall section of the inner container is adjustable.

The invention will now be described in more detail with reference to the accompanying drawings, which show one working embodiment thereof.

LIST OF THE SEVERAL VIEWS OF THE FIGURES.

DETAILED ACCOUNT OF WORKING EMBODIMENT OF THE INVENTION

Figure 2:
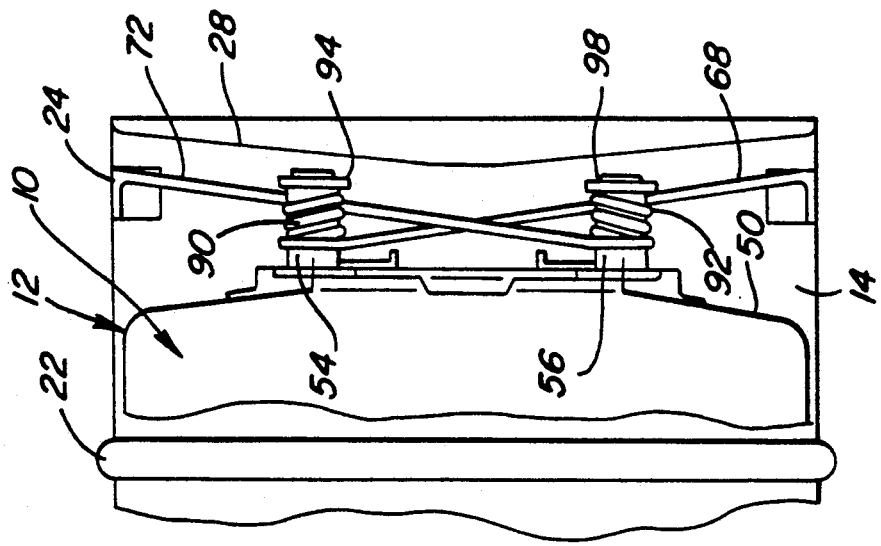
FIG. 2 shows one possible modification of the suspension illustrated in FIG. 1 on the right.

The heat storage means illustrated consists of an inner container 10 having the form of a circular cylinder and of a similar outer container 12, between which an insulating space 14 is constituted. One supply duct 16 and one return duct 18 are connected in the upper part of an end wall 20 of the inner housing 10 on the latter and extend through the insulating space 14 vertically downwards out of the outer container 12.

The outer container 12 consists of a cylindrical casing 24, which is stiffened by grooves 22, and which surrounds the inner container 10 concentrically with a small clearance of the order of a few millimeters, and of two end walls 26 and 28 which are inserted into the casing 24. Adjacent to the left end wall 26 there is a suspension element 30 which is secured to the inner surface of the outer container 12, for instance by welding. Adjacent to the right end wall 28 there is a further suspension element 32 which is attached to the inner surface of the casing 24 and it is connected by means of connecting bolts 54 and 56 with the inner container 10.

In the center of the left end wall 20 of the inner container 10 a guide sleeve 34 for a helical compression spring 36 is provided, such sleeve being arranged centered on the axis of the containers 10 and 12 between the inner container 10 and the outer container 12. The end wall 26, which is opposite to the end wall 20, of the outer container 12 also comprises a guide sleeve 38 for the compression spring 36, which is provided with an axially adjustable insert 40 for altering the effective length of the compression spring 36.

Figure 3:
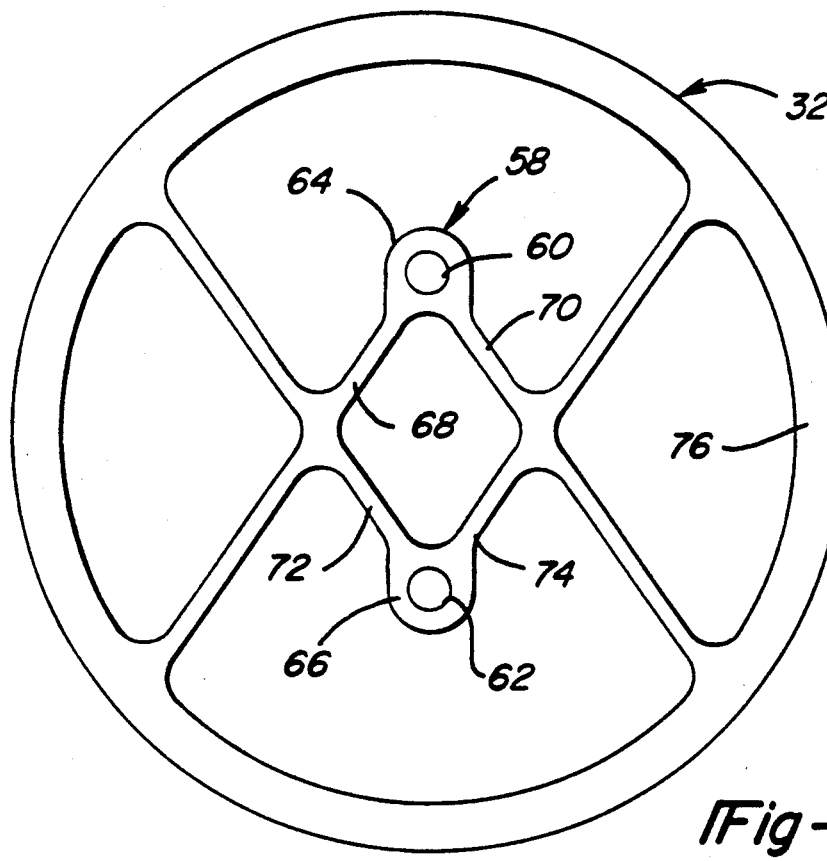
FIG. 3 is a view of the suspension element to be seen on the left in FIG. 1.

The suspension element 30—see FIG 3—possesses an inner, annular frame 42, from which there extend four radial ribs 44 in an outward direction, are offset by 90° relation to each other, and at their ends are provided with attachment flanges 46 for connection with the casing 24. The ribs 44 are in this case angled in relation to the plane of the inner frame 42 so that they make an acute angle with the axis of the inner frame and are constantly held under tension by the compression spring 36. In order to attach the inner frame 42 to the end wall 20 it is possible to utilize a thrust plate 48 also surrounding the guide sleeve 34 in an annular manner and connected with the end wall 20 of the inner container 10.

Figure 4:
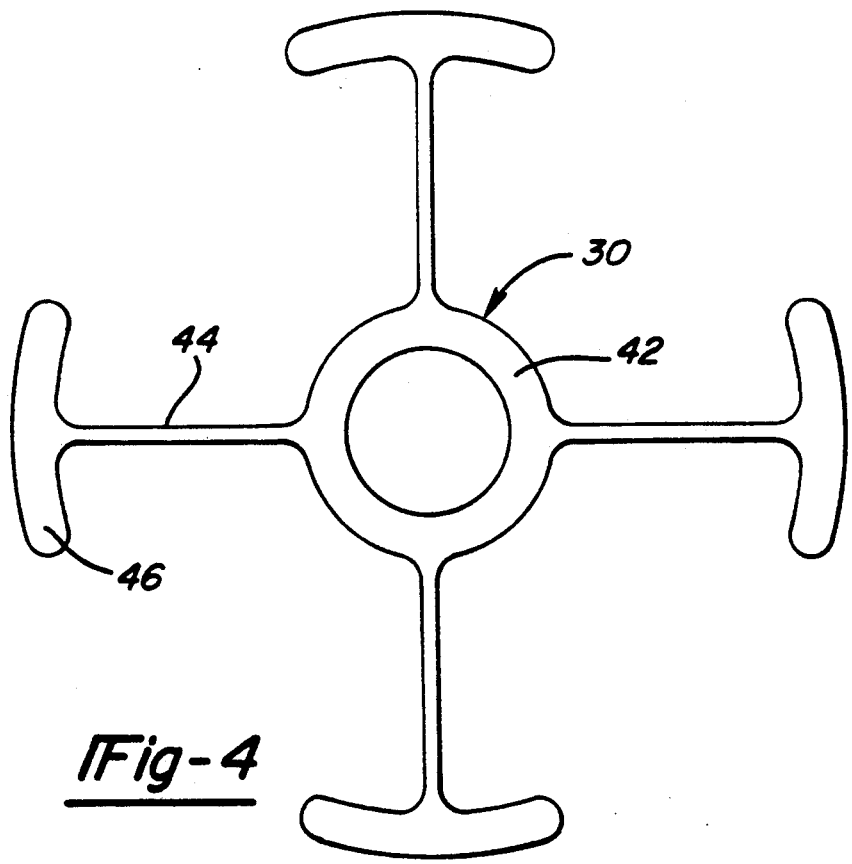
FIG. 4 is a view of a first, single-piece working embodiment illustrated in FIG. 1 on the right.

The suspension element 32—see FIG. 4—comprises two pairs 68, 70 and, respectively, 72 and 74 of ribs, which are respectively set in the form of a letter V, the end 64, and respectively 68, which is common to the ribs of each pair of ribs, functioning as an attachment section for the connection with the inner container 10. On the other end wall 50, which is remote from the end wall 20, of the inner container 10 there is a bracket 52, serving for the connection of the suspension element 32, on which in the vertical plane of symmetry of the inner container 10 two connection bolts 54 and 56 (which are placed at the same distance from the axis of the inner container) are arranged, the ends 64 and 66 thereof being provided with a respective hole 60 and, respectively, 62.

The ribs 68 and 70 and, respectively, 72 and 74 are respectively so arranged that the two pairs 68 and 70 and, respectively, 72 and 74 of ribs have a common bisector of the angles between them, on which the holes 62 and 64 are arranged and so intersect that they constitute a rhombic inner frame 58. The outer ends of the ribs 68 through 74 are connected with each other by an annular outer frame 76, which has an angled part 78 adapted to be connected with the inner surface of the casing 24.

The outer sections of the ribs 68 through 72 between the inner frame 58 and the outer frame 76 are angled in relation to the plane of the inner frame 58 for the transmission of tension forces.

Between the inner frame 58 of the suspension element 32 and the bracket 52 the connection bolts 54 and 56 have compression springs surrounding them, which always keep the ribs 68 through 74 under tension independently of the compression spring 36 and the thermal expansion at the suspension element 30.

The left suspension 30 in conjunction with the spring 36 functions as a fixed abutment for the inner container 10.

The right suspension 32 on the other hand constitutes a radial abutment with respect to the axis of the inner container 10, such abutment ensuring that there is the desired radial clearance between the inner container 10 and the outer container 12 owing to the tension, maintained by the compression springs, of the ribs 68 through 74 even in the event of thermal changes in length occurring.

Owing to its configuration the suspension element 32 is also suitable to prevent a relative rotation between the inner container 10 and the outer container 12.

Figure 1:
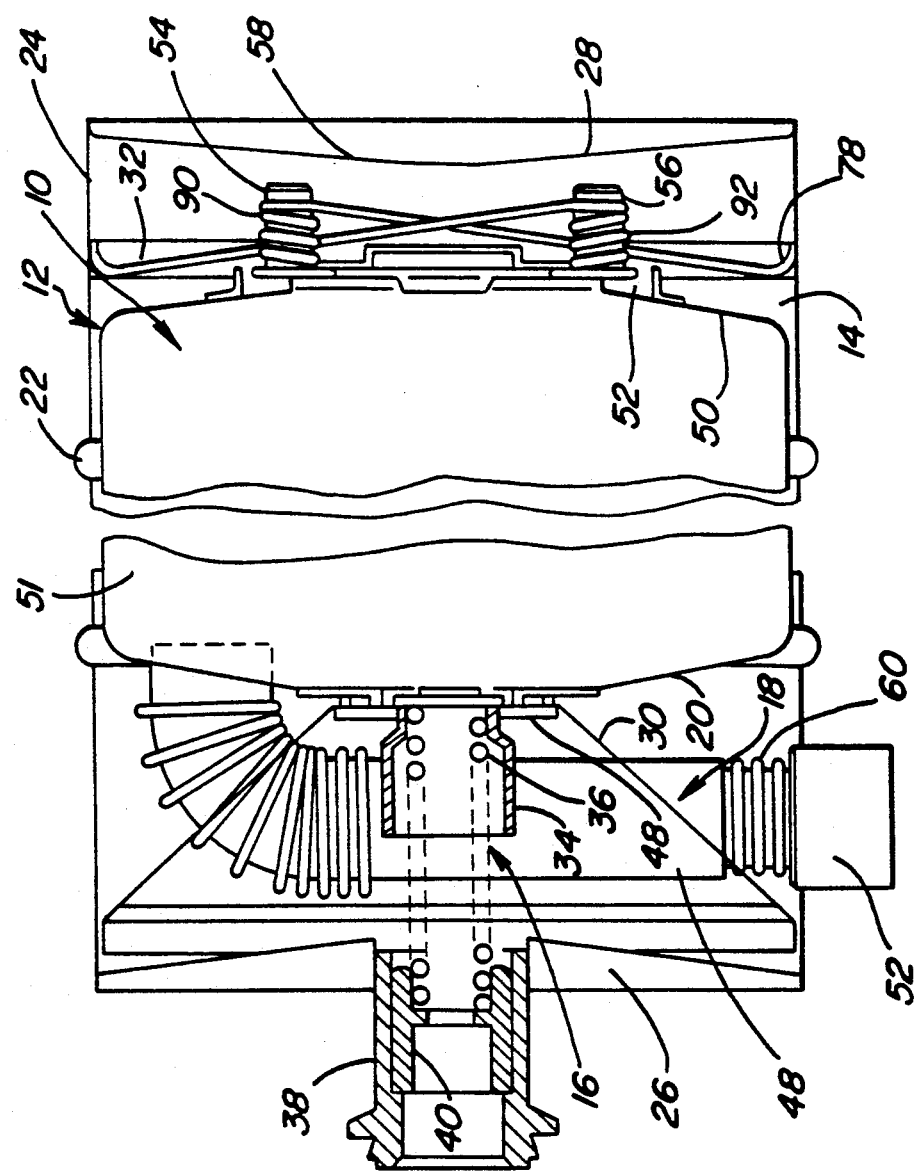
FIG. 1 shows an axial section taken through a heat storage means designed in accordance with the invention and having a cylindrical housing configuration.

While in the case of the radial abutment arrangement at the right end of the FIG. 1 the springs 90 and 92 tend to move the ends 64 and 66, which are connected with the inner container 10, of the ribs 68 through 72 away from the adjacent end wall 50 of the inner container in order to keep up the tension, this radial abutment arrangement may also be so designed that the springs 90 and 92 urge the ends, which are able to slide of the connection bolts 54 and, respectively, 56, towards the adjacent end wall of the inner container 10. In this case the compression springs 90 and 92 are arranged between the inner frame 58 of the suspension element and abutments 94 and 98 arranged at the free end of the connection bolts 54 and, respectively, 56.

Figure 5:
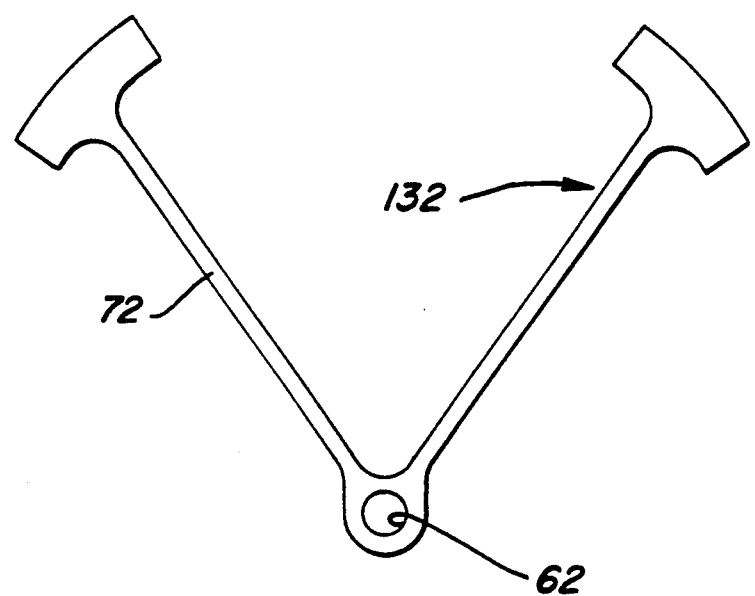
FIG. 5 is a view of a two-piece working embodiment of this suspension element.

As shown in FIG. 2 the suspension element 32 is made in two parts, that is to say it consists of two V-like elements 132, which are illustrated in FIG. 5; when they are employed the twisting effects owing to the opposite oblique position of the ribs 68 and 70 on the one hand and 72 and 74 on the other hand adjacent to the nodal points of these ribs—in the case of a single—piece design—are checked.

I claim:

1. A heat storage means for vehicle heating systems run on waste engine heat, comprising:

an inner container accommodating a storage core, an outer container surrounding the inner one with a clearance to constitute a preferably evacuated insulating space, two ducts running from the outside through the insulating space to the inner container, of which one functions as a supply duct for a heat vehicle fluid and the other functions as a return duct therefor, and the inner container is suspended at two end walls, via a respective group of ribs with a low thermal conductivity, on the outer container, between a first end wall of the inner container and the outer container at least one spring is so arranged that it tends to change the distance apart of the opposite end walls of the inner container and of the outer container and between the container wall connecting the two end walls of the inner container and the adjacent container wall of the outer container the insulating space has its minimum thickness, wherein the ribs, which are associated with the other, second end wall of the inner container, are able to be slid in the direction of the container wall which connects the end walls of the inner container, in relation to the inner container while perpendicularly thereto they are connected in a non-sliding manner with the inner container and between the ends, which are in engagement with the inner container, of these ribs and the inner container at least one spring is arranged, which tends to change the distance between these ends and the second end wall of the inner container and therefore to keep the ribs under tension.

2. The heat storage means as claimed in claim 1, comprising a plurality of connection bolts for connection of the associated ribs to the second end wall, such bolts extending in the direction of action of the springs and an end in the form of an attachment section of a rib is connected with such bolts.

3. The heat storage means as claimed in claim 1, wherein the ribs are positioned so obliquely in relation to the direction of action of the spring that they are biased by the springs to produce a tension.

4. The heat storage means as claimed in claim 1, wherein the ribs of at least one group are combined as a suspension element.

5. The heat storage means as claimed in claim 4, wherein the suspension elements are in the form of stampings.

6. The heat storage means as claimed in claim 5, wherein at least one suspension element is connected with the inner container in such a manner as to prevent relative twist.

7. The heat storage means as claimed in claim 6, comprising two attachment means on one end wall of the inner container in a symmetrical arrangement and with a clearance between them.

8. The heat storage means as claimed in claim 7, wherein the suspension element has two connection means turned towards the attachment points on the inner container and from such connection means two ribs in the form of a letter V are arranged and they extend to an external frame, and on the common bisector of the angles between them the connection means are so arranged that the two pairs of ribs arranged in the form of a letter V intersect with each other to constitute a rhombic frame.

9. The heat storage means as claimed in claim 1, comprising a spring placed between the first end wall of the inner container and the end wall, arranged opposite to it, the outer container.

10. The heat storage means as claimed in claim 9, wherein the effective length of the spring is adjustable.

* * * * *

UNITED STATES PATENT AND TRADEMARK OFFICE
CERTIFICATE OF CORRECTION

PATENT NO. : 5,114,071
DATED : May 19, 1992
INVENTOR(S) : Oskar Schatz

It is certified that error appears in the above-identified patent and that said Letters Patent is hereby corrected as shown below:

On the Title page, item [57]
    Abstract, line 4,
        "containing" should be --container--.

Abstract, line 34,
        "inenr" should be --inner--.

Column 2, line 43,
        "different" should be --difference--.

Column 2, line 49,
        delete "wall".

Column 4, line 6,
        after "90", insert --in--.

Signed and Sealed this

Ninth Day of November, 1993

*Attest:*

BRUCE LEHMAN

*Attesting Officer*       *Commissioner of Patents and Trademarks*